Jan. 3, 1928.

E. F. W. ALEXANDERSON 1,655,041

REGULATING APPARATUS

Filed Jan. 15, 1926

2 Sheets-Sheet 1

Inventor:
Ernst F. W. Alexanderson
by
His Attorney.

Jan. 3, 1928.

E. F. W. ALEXANDERSON 1,655,041

REGULATING APPARATUS

Filed Jan. 15, 1926  2 Sheets-Sheet 2

Inventor:
Ernst F. W. Alexanderson
by
His Attorney.

Patented Jan. 3, 1928.

1,655,041

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

REGULATING APPARATUS.

Application filed January 15, 1926. Serial No. 81,536.

My invention relates to apparatus for stabilizing the operation of electrical circuits, and has for its principal object the provision of an improved regulating apparatus that is operable to maintain stable operation of an electrical circuit under adverse conditions such as those encountered in the operation of high voltage power transmission lines subjected to heavy loads.

The maximum load that can be safely carried by a high voltage power transmission line is dependent on the character of the regulating apparatus utilized to maintain the circuit voltage. If the regulating apparatus is sluggish in its action, variations in load are likely to produce instability in the operation of synchronous machines connected to the circuit unless the circuit load is maintained below a predetermined value. This tendency to instability imposes a serious limitation on the magnitude of the load that can be safely carried by an alternator and transmission line provided with the usual vibratory regulating apparatus. In accordance with my invention the tendency to instability is greatly decreased and the safe load that can be carried by the alternator and transmission circuit is correspondingly increased by the provision of a stabilizing or regulating apparatus comprising an electric discharge device provided with a grid or control electrode having its potential controlled in a manner to anticipate changes in the phase of the alternator voltage, thus producing stable operation under conditions that would produce unstable operation with the types of regulating apparatus heretofore used.

My invention will be better understood from the following description when considered in connection with the accompanying drawings and its scope will be pointed out in the appended claims.

Figure 1:
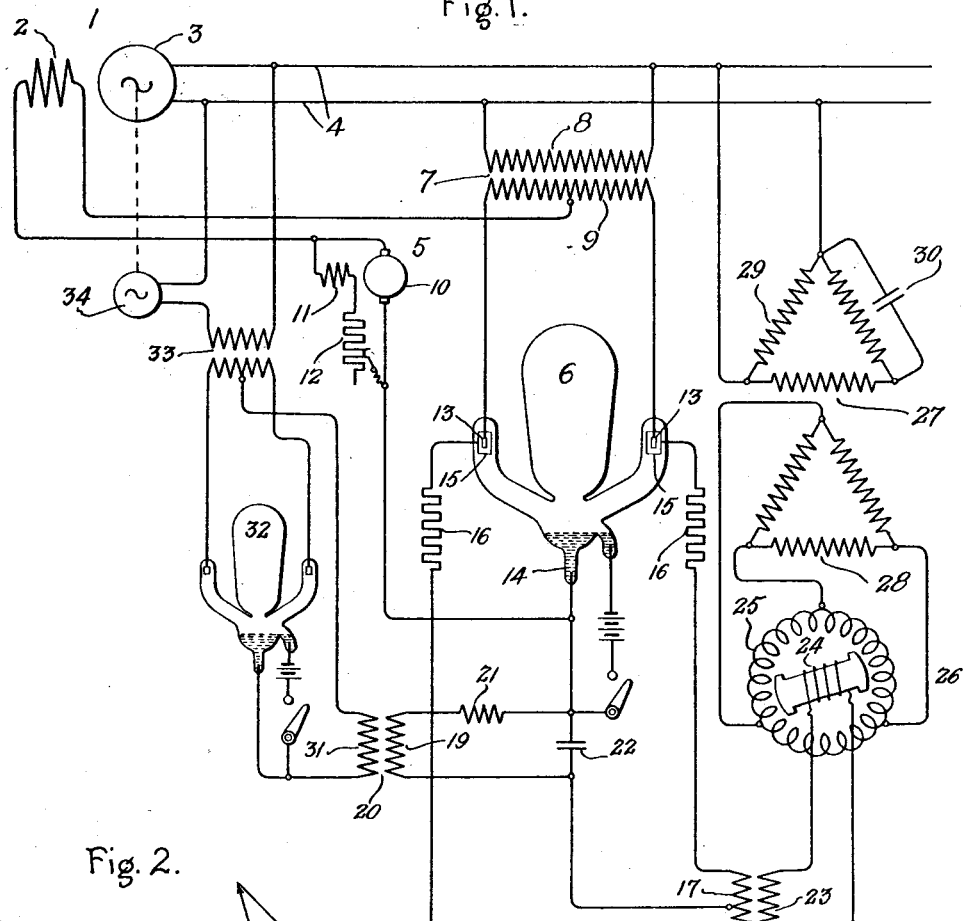
Figure 2:
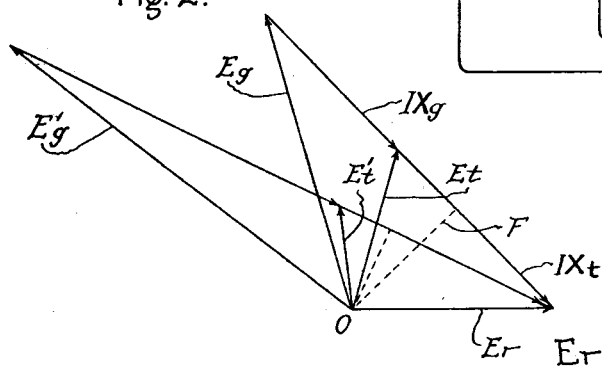
Figure 3:
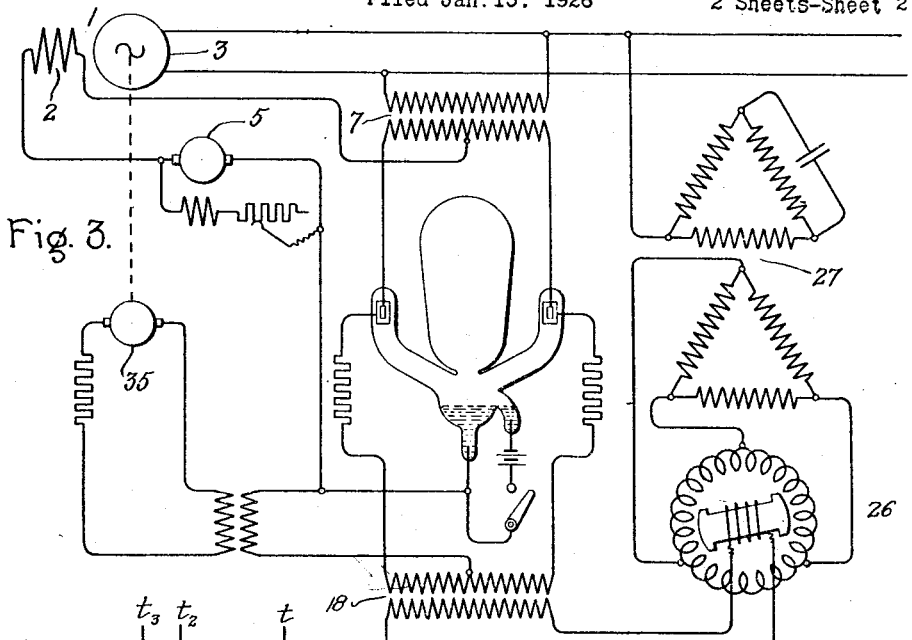
Figure 5:
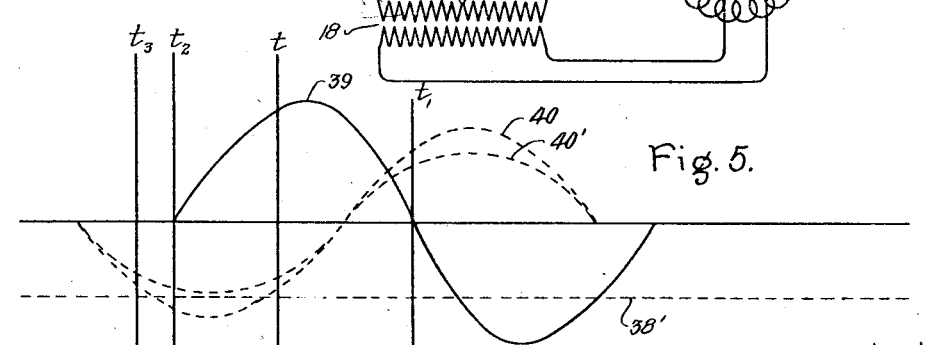
Figure 4:
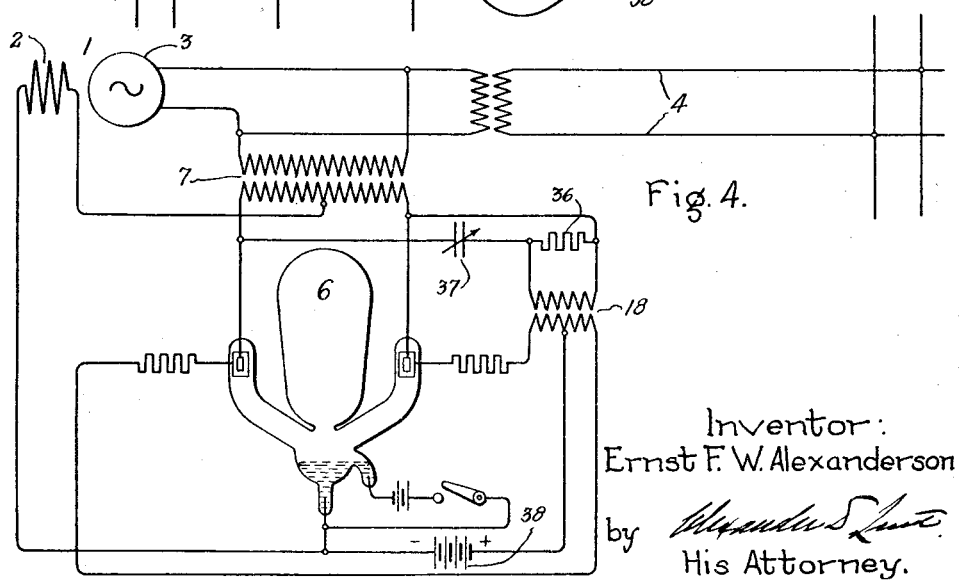

Referring to the drawings, Fig. 1 shows diagrammatically a regulating system wherein my invention has been embodied; Fig. 2 is a vector diagram illustrating certain details in the operation of the system; Figs. 3 and 4 show regulating systems which differ from that of Fig. 1 in various details; and Fig. 5 shows certain details in the operation of the modification illustrated by Fig. 4.

Fig. 1 shows an alternator 1 which is provided with a field winding 2 and with an armature 3 connected to a transmission circuit 4. Current is supplied to the field winding 2 from an exciter 5 and an electric discharge or continuous arc device 6 that is connected to the circuit 4 through a transformer 7. It will be observed that the transformer 7 comprises a primary winding 8 and a secondary winding 9; that the exciter 5 comprises an armature 10 and a field winding 11 which is connected to the armature 10 through an adjustable resistor 12; and that the continuous arc or vapor electric device 6 comprises anodes 13 connected to the terminals of the secondary winding 9 and a mercury cathode 14 which is connected to the winding 9 at a point intermediate its ends through a circuit comprising the exciter 5 and the field winding 2. The usual exciting electrode and auxiliary source of excitation are provided for continuously maintaining the arc of the device 6. It will be apparent that the arcs of devices 6 and 32 may be maintained continuously by any suitable means such as exciting electrodes or reactors connected in the circuits of these devices as set forth for example by United States Letters Patent of E. Weintraub, No. 1,134,786, April 6, 1915, or by other well known means.

The device 6 also comprises grids 15 which are connected to the cathode 14 through a circuit comprising resistors 16, a secondary winding 17 of a transformer 18, a secondary winding 19 of a transformer 20, and a reactor 21 and condenser 22 which are provided for smoothing out variations in the grid current. The transformer 18 is connected to the circuit 4 through its primary winding 23, a rotor winding 24 and a stator winding 25 of a phase shifter 26, and a transformer 27 comprising secondary windings 28 and primary windings 29 one of which has a condenser 30 connected to it for causing polyphase currents to be produced in the secondary windings 28. With these connections, the phase relation between the voltage applied to the anodes 13 by the line 4 and the component voltage applied to the grids 15 through a transformer 18 may be varied by adjustment of the phase shifter rotor winding 24.

The transformer 20 is connected to the transmission circuit 4 through its primary circuit 31, a rectifier 32, a transformer 33, and a small alternator 34 coupled to the alternator 1. With these connections the resultant voltage of the alternator 34 and the line 4 is applied to the primary circuit of the transformer 33, and a rectified potential of a value which varies in accordance with change in the magnitude of this resultant voltage is applied to the grid circuits of the device 6 through the transformer 20. The potential applied to the grids 15 is thus the resultant of component voltages one of which is applied through the transformer 18 and has its phase determined by the position of the phase shifter winding 24 and the other of which is applied through the transformer 20 and has its magnitude and phase determined by the phase relation of the voltages of line 4 and machine 34. The result that should be produced by variation in these component voltages will be readily understood upon consideration of Fig. 2.

In Fig. 2 the internal and terminal voltages of the machine 1, when this machine is operated at a given load, is represented by the vectors $E_g$ and $E_t$ respectively, the voltage at the other end of the transmission line is represented by the vector $E_r$, the reactance drop of the machine 1 is represented by the vector $IX_g$, and the reactance drop of the transmission line is represented by the vector $IX_t$. If the machine load increases, the internal and terminal voltages of the machine are changed as indicated by the vectors $E'_g$ and $E'_t$ respectively. The power output of the machine 1 is represented by the product $(IX_g + IX_t)(F)$, F being the perpendicular distance between the vector $IX_t$ and the origin O. This is true for the reason that the sum of $IX_g$ and $IX_t$ is directly proportional to the machine current and the line F is directly proportional to the terminal voltage multiplied by the power factor.

Stability in the operation of the machine is maintained only when an increase in load is immediately followed by an increase in the product $(IX_g + IX_t)(F)$. If the operation of the regulating apparatus is sluggish, this product is not changed promptly and the machine is likely to become unstable and to fall out of step. If the regulating apparatus is sensitive and works very quickly, the terminal voltage of the machine is maintained substantially constant, due to the prompt increase in excitation and internal voltage $E_g$ of the machine. With the regulating apparatus shown by Fig. 1, the machine excitation and internal voltage $E_g$ is automatically regulated in accordance with phase variation of the terminal voltage $E_t$. In order to readily understand the operation of this apparatus, a brief consideration of the operating characteristics of the device 6 will be required.

The magnitude of the current transmitted to the alternator field winding 2 through the continuous arc device 6 is dependent on the relation between the grid and anode potentials of this device. So long as the grid or anode potential is negative, no current is transmitted through the device. When the grid and anode potentials are both positive, current is transmitted through the device. The exact point in each half cycle of anode voltage at which the transmission of current through the device 6 is initiated is determined by a change in the polarity of the grid potential from a negative to a positive value. This point may be varied either by changing the phase relation between the grid and anode potentials, or by changing the bias of an alternating potential applied to the grids. The current of the device 6 is therefore zero when its grid and anode potentials are 180 degrees out of phase, gradually increases as the phase of the grid voltage is advanced with respect to that of the anode, and becomes a maximum when the grid and anode voltage are brought into phase with one another. Variation in a direct current bias voltage likewise has the effect of gradually advancing the point in the half cycle at which the transmission of current through the device is initiated.

Assuming the machines 3 and 34 to be driven by a suitable prime mover, the rotor winding 24 of the phase adjuster 26 to be adjusted to the proper position, and the machine load to be constant, no potential is applied to the grid circuit through the transformer 20 and just enough current is supplied through the device 6 to maintain the terminal voltage $E_t$ at its normal value. If the machine load increases and the machine tends to fall out of step, the phase relation between the voltages of line 4 and machine 34 changes, the resultant direct current voltage applied to the primary winding of transformer 20 through the rectifier 32 varies in value, a positive bias potential is applied to the grid circuit through the transformer 20, the point at which current transmission to the field winding 2 is initiated comes earlier in each half cycle of the anode voltage, and the excitation of the machine 1 is immediately increased to a value that ensures stable operation of the machine and circuit.

Likewise if the machine load decreases, the phase relation between the voltages of line 4 and machine 34 changes in reverse direction, the resultant direct current voltage applied to the primary winding of transformer 20 through the rectifier 32 varies, a negative bias potential is applied to the grid circuit through the transformer 20, the point at which current transmission to the field winding 2 is initiated comes later in each cycle of the anode voltage, and the excitation of the machine 1 is immediately decreased to a value that tends to restore the voltage to its normal value. The phase shifter 26 is utilized for rough adjustments of the machine excitation and the machine voltage is regulated very sensitively by the variable grid bias potential applied through the transformer 20. The variable bias potential may be produced in various ways.

Fig. 3 shows a regulating apparatus wherein the variable bias potential is produced by means of a direct current machine 35. The operation of this apparatus is similar to that of the apparatus shown by Fig. 1 and will be readily understood in view of the previous explanation.

Fig. 4 shows an embodiment of the invention which differs from that of Fig. 1 in that the phase adjuster 26 is replaced by phase control means comprising a resistor 36 and a condenser 37 connected between the transformer 18 and the secondary circuit of the transformer 7 and in that a direct current source 38 is provided for applying a positive bias potential to the grids of the device 6.

The operation of the embodiment illustrated by Fig. 4 will be explained by reference to Fig. 5, wherein the curve 39 represents the anode potential, the curves 40 and 40' represent different values of grid potential and the positive bias of battery 38 is represented by a broken line 38'. The phase relation between the anode and grid potentials when the load circuit 4 is operating at normal voltage may be assumed to be that indicated by curves 39 and 40. Under these conditions, the continuous arc device 6 opens at the instant $t$ when the grid potential becomes positive and closes at the instant $t_1$ when the anode potential passes through its zero value, and the excitation of the field winding 2 is maintained at its normal value. If the voltage of the load circuit increases, the grid potential is increased, the device 6 opens at an instant of time subsequent to the time $t$, the current of the winding 2 is reduced and the load circuit voltage tends to decrease to its normal value. If the grid potential decreases to the value represented by the curve 40', the grid is still positive at the instant $t_2$ when the anode becomes positive and current is transmitted through the device 6 during the entire half cycle, thus increasing the field excitation and restoring the load circuit voltage to its normal value without substantial delay between the beginning and correction of the variation from normal voltage.

The embodiments of the invention illustrated and described herein have been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States is:

1. The combination of a circuit subject to unstable operating conditions when its load exceeds a predetermined value, means for controlling the stability of said circuit, a continuous arc device comprising a cathode and anode connected to said control means and a grid for controlling the transmission of current between said cathode and anode, and means operable in accordance with said conditions for applying to said grid a potential whereby accumulative changes in said conditions are prevented.

2. The combination of an electrical machine comprising exciting and armature windings, excitation supply means comprising a vapor electric device provided with a cathode and an anode connected to said exciting winding and with a grid for controlling the transmission of current between said cathode and anode, and means operable in response to change in the phase of the terminal voltage of said armature winding for regulating the potential applied to said grid.

3. The combination of a synchronous machine provided with exciting and armature windings, a direct current source, excitation supply means comprising a continuously excited vapor electric device provided with a cathode and anode connected to said excitation winding through said source and with a grid arranged to prevent the starting of current between said cathode and anode, and means operable to control the potential of said grid in response to variation in the terminal voltage of said armature winding.

4. The combination of an electrical machine provided with exciting and armature windings, excitation supply means comprising a vapor electric device provided with a cathode and an anode connected to said exciting winding and with a grid for controlling the transmission of current between said cathode and anode, and means comprising an alternator driven in synchronism with said machine and connected to said armature winding in series relation between said cathode and grid for regulating the potential of said grid in response to phase variation in the terminal voltage of said armature winding.

5. The combination of an electrical machine provided with exciting and armature windings, excitation supply means comprising a vapor electric device provided with a cathode and an anode connected to said exciting winding and with a grid for controlling the transmission of current between said cathode and anode, means comprising an alternator driven in synchronism with said machine and connected to said armature winding in series relation between said cathode and grid for regulating the potential of said grid in response to phase variation in the terminal voltage of said armature winding, and means for applying an alternating potential to said grid.

6. The combination of an electrical machine provided with exciting and armature windings, excitation supply means comprising a vapor electric device provided with a cathode and an anode connected to said exciting winding and with a grid for controlling the transmission of current between said cathode and anode, means comprising an alternator driven in synchronism with said machine and connected to said armature winding in series relation between said cathode and grid for regulating the potential of said grid in response to phase variation in the terminal voltage of said armature winding, means for applying an alternating potential to said grid, and means for adjusting the phase of said alternating potential.

7. The combination of an electrical machine provided with exciting and armature windings, excitation supply means comprising a vapor electric device provided with a cathode and an anode connected to said exciting winding and with a grid for controlling the transmission of current between said cathode and anode, means operable to apply to said grid a bias potential which varies in accordance with phase variation in the terminal voltage of said armature winding, means for applying an alternating potential to said grid, and means for adjusting the phase of said alternating potential.

8. The combination of a circuit which comprises a synchronous machine and is subject to unstable operating conditions when its load exceeds a predetermined value, and means operable to adjust the excitation and internal voltage of said machine in accordance with variation in the phase of the terminal voltage of said machine.

9. The combination of a circuit which comprises a synchronous machine and is subject to unstable operating conditions when its load exceeds a predetermined value, and excitation control means operable to adjust the internal voltage of said machine substantially coincidently with variation in the phase of the terminal voltage of said machine.

10. The combination of a circuit which comprises a synchronous machine provided with a field winding and is subject to unstable operating conditions when its load exceeds a predetermined value, and excitation control means connected in series with said winding and operable to adjust the internal voltage of said machine within a time insufficient to prevent accumulative changes in said conditions.

In witness whereof, I have hereunto set my hand this fourteenth day of January, 1926.

ERNST F. W. ALEXANDERSON.